(12) United States Patent
Rygas et al.

(10) Patent No.: US 8,846,778 B2
(45) Date of Patent: Sep. 30, 2014

(54) METHOD AND COMPOSITION FOR PRINTING TACTILE MARKS AND SECURITY DOCUMENT FORMED THEREFROM

(75) Inventors: Tadeusz Piotr Rygas, Ottawa (CA); Thivaharan Thurailingam, Kanata (CA); Silviu Crisan, Gatineau (CA); Norbert Joseph Sylvain Chalifoux, Cantley (CA)

(73) Assignee: Canadian Bank Note Company, Limited, Ottawa (CA)

( * ) Notice: Subject to any disclaimer, the term of this patent is extended or adjusted under 35 U.S.C. 154(b) by 243 days.

(21) Appl. No.: 13/131,781

(22) PCT Filed: Dec. 21, 2009

(86) PCT No.: PCT/CA2009/001869
§ 371 (c)(1),
(2), (4) Date: Jun. 17, 2011

(87) PCT Pub. No.: WO2010/071993
PCT Pub. Date: Jul. 1, 2010

(65) Prior Publication Data
US 2011/0250410 A1    Oct. 13, 2011

(30) Foreign Application Priority Data

Dec. 22, 2008   (WO) ................ PCT/CA2008/002240

(51) Int. Cl.
| | | |
|---|---|---|
| *C09D 11/10* | (2014.01) | |
| *B41J 3/32* | (2006.01) | |
| *C08J 7/04* | (2006.01) | |
| *B41M 1/12* | (2006.01) | |
| *B42D 15/00* | (2006.01) | |
| *G09B 21/00* | (2006.01) | |
| *B41M 3/16* | (2006.01) | |
| *G07D 7/00* | (2006.01) | |
| *G07D 7/20* | (2006.01) | |

(52) U.S. Cl.
CPC ............ *C09D 11/10* (2013.01); *B42D 2033/20* (2013.01); *B41M 1/12* (2013.01); *B42D 15/0013* (2013.01); *G09B 21/003* (2013.01); *G09B 21/008* (2013.01); *B41J 3/32* (2013.01); *B42D 2035/14* (2013.01); *B41M 3/16* (2013.01); *G07D 7/0086* (2013.01); *G07D 7/20* (2013.01); *B42D 2035/28* (2013.01)
USPC ......... 522/152; 428/195.1; 427/510; 101/129

(58) Field of Classification Search
USPC ......... 428/195.1; 427/510; 522/152; 101/129
See application file for complete search history.

(56) References Cited

U.S. PATENT DOCUMENTS

| | | |
|---|---|---|
| 3,403,621 A | 10/1968 | Simson et al. |
| 4,105,806 A | 8/1978 | Watt |
| 4,296,947 A | 10/1981 | Spatz et al. |
| 4,537,805 A | 8/1985 | Lin |
| 4,623,558 A | 11/1986 | Lin |
| 5,512,122 A | 4/1996 | Sokyrka |
| 5,664,041 A | 9/1997 | Szum |
| 5,753,350 A | 5/1998 | Bright |
| 5,854,300 A | 12/1998 | Gould et al. |
| 6,013,330 A | 1/2000 | Lutz |
| 6,085,010 A | 7/2000 | Zahora et al. |
| 6,089,614 A | 7/2000 | Howland et al. |
| 6,099,415 A | 8/2000 | Lutz |
| 6,120,636 A | 9/2000 | Nilsen et al. |
| 6,164,850 A | 12/2000 | Speakman |
| 6,165,609 A | 12/2000 | Curatolo |
| 6,248,804 B1 | 6/2001 | Lutz |
| 6,249,588 B1 | 6/2001 | Amidror et al. |
| 6,306,924 B2 | 10/2001 | Szum |
| 6,402,403 B1 | 6/2002 | Speakman |
| 6,500,495 B2 | 12/2002 | Lutz |
| 6,558,753 B1 | 5/2003 | Ylitalo et al. |
| 6,569,529 B1 | 5/2003 | Phillips et al. |
| 6,720,042 B2 | 4/2004 | Ylitalo et al. |
| 6,730,714 B2 | 5/2004 | Ylitalo et al. |
| 6,787,583 B2 | 9/2004 | Veya et al. |
| 6,806,024 B1 | 10/2004 | Kura et al. |
| 6,846,075 B2 | 1/2005 | Ylitalo et al. |
| 6,849,343 B2 | 2/2005 | Phillips et al. |
| 6,896,944 B2 | 5/2005 | Ylitalo et al. |
| 6,933,048 B2 | 8/2005 | Phillips et al. |
| 6,991,860 B2 | 1/2006 | Phillips et al. |
| 7,025,453 B2 | 4/2006 | Ylitalo et al. |
| 7,097,908 B2 | 8/2006 | Lacroix et al. |
| 7,230,113 B2 | 6/2007 | Chauhan et al. |
| 7,235,300 B2 | 6/2007 | Phillips et al. |
| 7,423,072 B2 | 9/2008 | Lee et al. |
| 7,462,650 B2 | 12/2008 | Sommerlade et al. |

| | | | |
|---|---|---|---|
| 7,556,841 B2 | 7/2009 | Kimball et al. | |
| 7,629,400 B2 | 12/2009 | Hyman | |
| 7,635,439 B2 | 12/2009 | Child et al. | |
| 7,645,884 B2 | 1/2010 | Chauhan et al. | |
| 7,655,296 B2 | 2/2010 | Haas et al. | |
| 7,727,289 B2 | 6/2010 | Frazee et al. | |
| 7,740,693 B2 | 6/2010 | Potrawa et al. | |
| 7,754,827 B2 | 7/2010 | Weikard et al. | |
| 7,763,083 B2 | 7/2010 | Kimball et al. | |
| 7,771,781 B2 | 8/2010 | Kawakami | |
| 7,772,181 B2 | 8/2010 | Amin et al. | |
| 7,776,108 B2 | 8/2010 | Shah et al. | |
| 2003/0082305 A1 | 5/2003 | Krohn | |
| 2003/0232210 A1 | 12/2003 | Haas et al. | |
| 2005/0147807 A1 | 7/2005 | Haas et al. | |
| 2005/0176841 A1 | 8/2005 | Krohn | |
| 2005/0180020 A1 | 8/2005 | Steenblik et al. | |
| 2006/0089450 A1 | 4/2006 | Jansen et al. | |
| 2006/0189113 A1 | 8/2006 | Vanheusden et al. | |
| 2006/0246367 A1 | 11/2006 | Herbert et al. | |
| 2006/0280331 A1 | 12/2006 | Chosson et al. | |
| 2007/0104882 A1 | 5/2007 | Kodas et al. | |
| 2007/0123613 A1 | 5/2007 | Weikard et al. | |
| 2007/0184212 A1 | 8/2007 | Nimura et al. | |
| 2008/0093423 A1 | 4/2008 | Kodas et al. | |
| 2008/0100780 A1 | 5/2008 | Suzuki et al. | |
| 2008/0145564 A1 | 6/2008 | Allam et al. | |
| 2008/0152926 A1 | 6/2008 | Baikerikar et al. | |
| 2008/0213545 A1 | 9/2008 | Allam et al. | |
| 2008/0287563 A1 | 11/2008 | Lee et al. | |
| 2008/0287565 A1 | 11/2008 | Liska et al. | |
| 2009/0111907 A1 | 4/2009 | Yang et al. | |
| 2009/0162645 A1 | 6/2009 | Matsuhira | |
| 2009/0197987 A1 | 8/2009 | Hayoz et al. | |
| 2009/0208710 A1 | 8/2009 | Pershing et al. | |
| 2009/0302509 A1 | 12/2009 | Debiasi et al. | |
| 2009/0317623 A1 | 12/2009 | Purdy et al. | |
| 2010/0055415 A1 | 3/2010 | Belelie et al. | |
| 2010/0055484 A1 | 3/2010 | Chretien et al. | |
| 2010/0112362 A1 | 5/2010 | Craciun et al. | |
| 2010/0154146 A1 | 6/2010 | Shah et al. | |
| 2010/0178508 A1 | 7/2010 | Kasch et al. | |
| 2010/0184913 A1 | 7/2010 | Ebbrecht et al. | |
| 2010/0188765 A1 | 7/2010 | Matsumoto et al. | |
| 2010/0197708 A1 | 8/2010 | Talley et al. | |
| 2010/0210745 A1 | 8/2010 | McDaniel et al. | |

FOREIGN PATENT DOCUMENTS

| | | | |
|---|---|---|---|
| CA | 2414243 A1 | 11/2002 | |
| CA | 2414243 C | 11/2002 | |
| CN | 1962286 A | 11/2005 | |
| CN | 101665641 A | 9/2009 | |
| DE | 3404723 A1 | 9/1985 | |
| EP | 108630 A2 | 5/1984 | |
| EP | 0331288 B1 | 8/1994 | |
| GB | 2319264 A | 5/1998 | |
| WO | 9523772 | 9/1995 | |
| WO | 9706959 | 2/1997 | |
| WO | 9731051 | 8/1997 | |
| WO | 9748557 | 12/1997 | |
| WO | 0231058 A1 | 4/2002 | |
| WO | 0238688 A2 | 5/2002 | |
| WO | 02057232 A2 | 7/2002 | |
| WO | 03106183 A1 | 12/2003 | |
| WO | 2004087435 A1 | 10/2004 | |
| WO | 2005028577 A | 3/2005 | |
| WO | 2005068187 A2 | 7/2005 | |
| WO | 2006065541 A1 | 6/2006 | |
| WO | 2006098676 A1 | 9/2006 | |
| WO | 2008015474 A1 | 2/2008 | |
| WO | 2008045478 A1 | 4/2008 | |
| WO | 2009045988 A | 4/2009 | |
| WO | 2009054621 A2 | 4/2009 | |
| WO | 2009156400 A1 | 12/2009 | |
| WO | 2010005377 A1 | 1/2010 | |
| WO | 2010040972 A1 | 4/2010 | |
| WO | 2010070678 A1 | 6/2010 | |

OTHER PUBLICATIONS

International Search Report for PCT/CA2009/001869, dated Mar. 1, 2010.
European Search Opinion for European Patent Application No. 09 833 978.1, dated May 8, 2012.
Supplemental European Search Report for European Patent Application No. 09 833 978.1, dated May 8, 2012.
International Preliminary Report on Patentability for International Patent Application No. PCT/CA2009/001869 dated Jun. 29, 2011.
International Search Report for International Patent Application No. PCT/CA2009/001869 dated Mar. 1, 2010.
Written Opinion for International Patent Application No. PCT/CA2009/001869 dated Mar. 1, 2010.
International Preliminary Report on Patentability for International Patent Application No. PCT/CA2008/002240 dated Jun. 29, 2011.
International Search Report for International Patent Application No. PCT/CA2008/002240 dated Sep. 4, 2009.
Written Opinion for International Patent Application No. PCT/CA2008/002240 dated Sep. 4, 2009.
International Search Report issued for International Patent Application No. PCT/CA2009/001868 dated Apr. 7, 2010.
Written Opinion issued for International Patent Application No. PCT/CA2009/001868 dated Apr. 7, 2010.
Supplementary Search Report issued for European Patent Application No. 09 833 977.3 dated May 7, 2012.
McCallum et al., "Producing tactile maps using new inkjet technology: an introduction," Cartographic J., 2003, 40(3), pp. 294-298.
Jehoel et al., "An Evaluation of Substrates for Tactile Maps and Diagrams: Scanning Speed and Users' Preferences", Tactile Graphics, 2005, vol. 99, No. 2, pp. 1-21.
English translation of Abstract for Korean Patent Application No. KR20080098099A, published Nov. 7, 2008.
English translation of Abstract for Japanese Patent No. JP3494399, published Feb. 8, 2000.
English translation of Japanese Patent Publication No. 2000-038531, published Feb. 8, 2000.
English translation of International Patent Application No. PCT/CH2006/000684, published Jun. 14, 2007.
English translation of Korean Patent No. 10-0875643 (Dec. 17, 2008).

*Primary Examiner* — Michael Pepitone
*Assistant Examiner* — Jessica Roswell
(74) *Attorney, Agent, or Firm* — Heslin Rothenberg Farley & Mesiti P.C.

(57) ABSTRACT

Ultraviolet light-curable deposits are printed onto a substrate in a predetermined pattern to make tactile marks (e.g. Braille-like resin dots) for use by people with impaired vision to, for example, recognize the denominations of banknotes. The deposit demonstrates high adhesion due to: (1) presence of 20-80% (wt.) of a low viscosity acrylate component to provide a substrate-penetrating property; and, (2) 2-30% (wt.) of an adhesion-promoting acid acrylate. The deposit material further includes 1-30% (wt.) of urethane acrylate, 1-30% by weight of reactive diluent, photoinitiator and 1-10% (wt.) of rheological adsorbing additive. Optimally, the adhesion promoter is added after the other components have been mixed with the rheological additive. The printing step may be followed by heating before the curing step to increase penetration of the ink into the substrate. The deposit may comprise a taggant for use as a security feature.

21 Claims, 2 Drawing Sheets

METHOD AND COMPOSITION FOR PRINTING TACTILE MARKS AND SECURITY DOCUMENT FORMED THEREFROM

CROSS REFERENCE TO RELATED APPLICATIONS

This application is a national stage filing under section 371 of International Application No. PCT/CA2009/001869, filed on Dec. 21, 2009, and published in English on Jul. 1, 2010 as WO 2010/071993, and claims priority to PCT application No. PCT/CA2008/002240 filed on Dec. 22, 2008. The entire disclosures of these applications are hereby incorporated herein by reference.

FIELD OF THE INVENTION

The invention relates to the field of industrial printing compositions and, more particularly, to improved compositions for use in security document printing to print tactile marks, for use by the visually impaired, onto security documents (e.g. banknotes).

BACKGROUND

There is a need and desire to incorporate physical features into products handled by visually impaired people so that they can discern certain characteristics relating to such products. For example, it is important that visually impaired people be able to distinguish and use products such as security documents, in particular, different denominations of banknotes. For this purpose, currency-issuing national banks are implementing various features in the production of banknotes. Examples include varying the size of banknotes and printing tactile marks, such as Braille markings or deep intaglio patterns and non-intaglio, deep embossments on the banknotes which may be discerned by touch (i.e. by the user feeling the document in the area of such marks, patterns and embossments). However, in order to be effective and acceptable for use in the security printing industry, the composition to be used to print such tactile markings onto a banknote substrate must produce markings which have a durable tactility and integrity. The compositions used to date for this purpose have been found to lack durability in one or both of tactility and integrity, because the tactile markings they produce either too quickly become flattened over a period of use so as to become less tactile or too easily become broken off or torn from the substrate on which they were printed, or both.

Therefore, there is a need for an improved method and composition for industrial printing of tactile markings onto substrates, particularly banknotes, which are required to remain intact throughout a given circulation life.

SUMMARY OF THE INVENTION

In accordance with the invention a method is provided for printing a tactile mark onto a substrate sheet, such as a security document (e.g. banknote), and security documents made by the method. Further, the invention provides a printable, ultraviolet light curable deposit material for printing deposits onto a substrate in a predetermined pattern to form tactile marks.

Deposits are printed onto the substrate in a predetermined pattern using an ultraviolet light curable deposit material comprising: (i) 20-80% by weight of low viscosity acrylate having a viscosity below 200 cP at 25° C.; (ii) 1-30% by weight of urethane acrylate; (iii) 1-30% by weight of reactive diluent; (iv) photoinitiator in an amount sufficient to enable curing of the deposit material; (v) 1-10% by weight of rheological adsorbing additive; and, (vi) 2-30% by weight of acid acrylate adhesion promoter, wherein the specified weight percentages of components (i)-(iii), (v) and (vi) are relative to a total weight of components (i)-(vi) combined, and the deposit material has a viscosity in the range of about 2,000 cP to 25,000 cP at 25° C. The printed deposits are exposed to ultraviolet light to cure the printed deposits, thereby forming the tactile marks.

The acid acrylate adhesion promoter is preferably added after components (i) to (iv) have been at least partly adsorbed on the rheological additive. In an exemplary embodiment the photoinitiator is a mixture of photoinitiators in an amount of 1-12% by weight relative to a total weight of components (i)-(vi) combined and the reactive diluent is tri-functional. The low viscosity acrylate may be an acrylic monomer selected from the group consisting of neopentyl glycol diacrylate, tetrahydrofurfuryl acrylate, tetrahydrofurfuryl methacrylate, stearyl acrylate and dipropylene glycol diacrylate; and the urethane acrylate is an aliphatic polyester urethane acrylate.

The deposits may be printed by screen printing onto a paper or polymer substrate for banknotes, for example. A further step of controlled heating of the deposits prior to the curing may be performed to cause an increase of penetration of the deposits into the substrate. The rheological adsorbing additive may comprise fumed silica or precipitated silica gel.

Optionally, the deposit material may further comprise a predetermined taggant the amount and/or pattern of which in the cured deposits is detectable and compared with a self-verification code, for use as a security feature. Such taggant may be machine detectable for automated authentication of a banknote comprising the substrate sheet with tactile marks printed thereon. Several examples of taggant are provided, including a taggant with particles of a size from 1-80 micrometers and having magnetic properties, for example, carbonyl iron and magnetic iron oxides, whereby their signature may be recorded on the substrate as a self-verification code. The taggant may include a fluorescent dye. Further exemplary taggants are elemental silicon, retroreflective glass beads, cholesteric liquid crystal pigments, piezoelectric particles and optical-interference-based pigments with magnetic properties. For example, the deposit material may include microlenses mixed therein for printing onto the substrate for use as a security feature, whereby the microlenses provide an optical magnification of at least 2 and have a predetermined pitch which is close enough to a pitch of a background image of the substrate sheet to create kinetic Moiré effects.

A printable, ultraviolet light curable deposit material is also provided for printing deposits onto a substrate in a predetermined pattern to form tactile marks. The deposit material comprises: (i) 20-80% by weight of low viscosity acrylate having a viscosity below 200 cP at 25° C.; (ii) 1-30% by weight of urethane acrylate; (iii) 1-30% by weight of reactive diluent; (iv) photoinitiator in an amount sufficient to enable curing of the deposit material; (v) 1-10% by weight of rheological adsorbing additive; and, (vi) 2-30% by weight of acid acrylate adhesion promoter, wherein the specified weight percentages of components (i)-(iii), (v) and (vi) are relative to a total weight of components (i)-(vi) combined, and the deposit material has a viscosity in the range of about 2,000 cP to 25,000 cP at 25° C. Preferably, the acid acrylate adhesion promoter is added after components (i) to (iv) have been at least partly adsorbed on the rheological additive. The low viscosity acrylate may be an acrylic monomer selected from the group consisting of neopentyl glycol diacrylate, tetrahydrofurfuryl acrylate, tetrahydrofurfuryl methacrylate, stearyl acrylate and dipropylene glycol diacrylate; and the urethane acrylate is an aliphatic polyester urethane acrylate. The photoinitiator is preferably a mixture of photoinitiators and the reactive diluent may be tri-functional.

BRIEF DESCRIPTION OF THE DRAWINGS

Embodiments of the invention are described with reference to the following drawings in which like reference numerals refer to like elements throughout.

DETAILED DESCRIPTION

Means for improving printed tactile marks have been developed and are claimed herein. Specifically, the invention provides an improved deposit material for printing deposits onto a substrate (such as for a banknote or other security document) to form tactile marks having improved durability. The deposit material claimed herein is printable onto a substrate to form deposits which are cured by ultraviolet light (UV) to produce tactile marks. Further, optional, security features have also been developed for use in the production of security documents having the tactile marks printed on them according to the invention.

Figure 1:
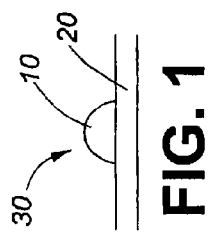
FIG. 1 is a profile view of an exemplary tactile mark, in the form of a dot, printed onto a banknote substrate using a composition in accordance with the invention, wherein the dimensions (shape/height) of the deposit forming the mark and relative dimensions are exaggerated for illustrative purposes only.

In respect of the illustrated embodiments described herein, deposits of the UV-curable deposit material described herein are printed onto a banknote substrate, preferably using flat screen or rotary screen printing machines, according to the printing methods which are well known in the printing industry. Referring to the illustration of an exemplary tactile mark 30 shown in FIG. 1, a predetermined amount of a UV-curable deposit material 10 is printed onto a substrate 20 for each tactile mark 30 being printed. Once the deposit material 10 has been printed as deposits onto the substrate 20, the deposits are cured by exposing them to ultraviolet (UV) light to produce the tactile marks 30. In addition to the formulation of the composition of the deposit material, the length of time of exposure of the substrate to the deposit material, after printing of the deposits and before curing, affects the degree of penetration of the deposit material into the paper, and a longer exposure time will result in increased penetration.

Figure 2:
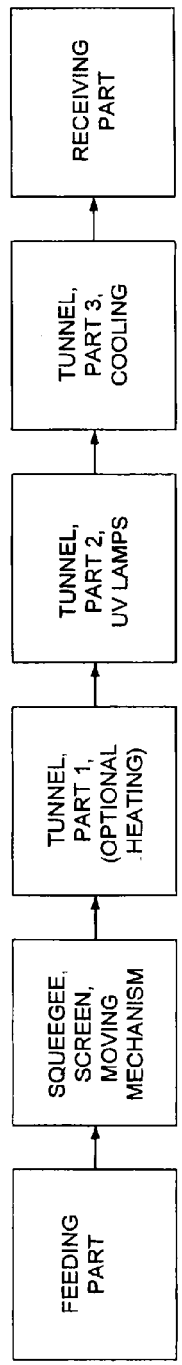
FIG. 2 is a block diagram illustration of an exemplary method using a silkscreen process for printing a composition in accordance with the invention, to print tactile marks onto a substrate sheet for a banknote.

In one printing process example, illustrated by FIG. 2, a full-scale press test was carried out using a flat-screen SPS Screen Press with SPS Turbostar Conveyer (both from SPS Rehmus, Wuppertal, Germany), operating at 2100 sheets (of substrate) per hour. A curing tunnel was equipped with two UV-mercury lamps, providing a total UV exposure of about 0.8 J/cm$^2$, as measured using an EIT Power Puck UV-exposure meter (available from EIT Inc., Sterling, Va.). The marking patterns made from a 60-mesh screen used in this printing, were circular with diameters of 1 mm. In the result, tactile marks were produced in the form of dots having heights from about 115 to 170 μm. The deposit material, when printed onto the substrate sheet at a rate of about 1000-7300 sheets per hour, had a viscosity of about 12,000 cP at 25° C. and the deposits are cured by ultraviolet light exposure of about 0.2-3 J/cm$^2$. Although in this example the tactile marks formed dots, resembling Braille characters, it will be understood by the reader that many other printing options can be used to produce other forms of tactile marks, as desired, for a given application. For example, other shapes, such as bars, ovals, stars or triangles may be used. Further, they may be applied in such a manner as to provide secondary tactile structure, such as humps or valleys, if desired for a particular application. In this example, a sheet fed screen press was used but a rotary screen web press would instead use substrate rolls. Equally, while a paper substrate was used in this example, a polymer substrate or other substrate may be selected, as desired, for another embodiment.

Additional effects can be achieved, if desired, by adding glass beads, plastic beads or crushed glass particles to the varnish. The beads or particles, in addition to increased tactility, can also provide optical effects, contributing to the overall security of the product. For example, a layer of glass beads can provide the optical Moiré effect, which cannot be copied on color copying machines, as described in Example 1 herein. The Moiré effect will be visible on substrates printed with parallel lines or shapes, if the repetitive distance between the lines is close to the diameter of the glass beads. Example 2 herein describes an example of the Moiré effect which uses glass beads having diameters of 38 micrometers. An additional advantage of using beads is that they provide a specific surface texture, which helps in tactile recognition of the marks by visually impaired people. The textured surface gives a significantly different feeling, compared to a smooth-cured dot surface. Therefore, due to the overt Moiré effect and the surface texture effect, an implementation based on beads present in the dots may be preferred for some document security applications.

The formulation of the composition of the deposit material, for the printing of tactile marks, is particularly directed and suitable to produce durable printed tactile marks 30. The deposit material 10 (which, being printable, may be referred to as ink-like in form) is used to print the tactile marks 30. It is an ultraviolet light (UV)-curable material, the properties, preparation and composition of which are significantly different from the conventional, known UV-cured screen inks. In particular, the viscosity of the deposit material 10 can be as high as 25,000 cP at 25° C. representing up to ten times the viscosity of conventional screen inks. For printability, the viscosity should be in the range of about 2,000-25,000 cP at 25° C.

Monofunctional acrylates give linear polymers which, in fast-curing UV-curing systems, means that they are soluble in some organic solvents and they have low mechanical strength. Di- and multi-functional acrylates provide not only linear polymerization but also cross-linking, so they reduce or eliminate solubility in organic solvents and increase the strength of the UV-cured material. However, di- and multi-functional acrylates contribute to rigidity of the cured polymer. Although difunctional oligomers are not required in order for the formulation to produce markings having elasticity, it may be beneficial to include them in some applications because then the properties may be controlled by adjusting the ratio of monofunctional material to di- or multifunctional material.

Surprisingly, the inventors discovered that the conventional, known adhesion promoters (e.g. Resin PKHB, available from Inortech, Montreal, Quebec, Canada) are not effective to produce sufficient adhesion of the tactile marks to a paper substrate. Instead, it was found that the adhesion of printed dots to a paper substrate improved with an addition of a low viscosity acrylate, which partly penetrated through the paper. By low viscosity it is meant that the viscosity is below about 200 cP at 25° C.

In addition, further improvement was, surprisingly, found to result upon adding an acid acrylate component to increase adhesion. Further improvement was found when this is done after mixing the acrylates with a rheology modifier used for control of the shape of the deposited ink. The acrylates include a urethane acrylate for increased elasticity.

Generally, the ultraviolet light (UV)-curable deposit material has a composition which includes a low viscosity monomeric acrylate having a viscosity below 200 cP at 25° C., in an amount of about 20-80% by weight, and a urethane acrylate in an amount of about 1-30% by weight. A reactive diluent, of about 1-30% by weight, contributes to the penetrating properties. A photoinitiator is included, sufficient to obtain curing, and a rheological adsorbing additive in an amount of 1-10%. An acid acrylate adhesion promoter, in an amount of 2-30% by weight, is also included and, optimally, this component is added after the acrylate components have been at least partly adsorbed on the rheological additive.

In particular, the deposit material 10 used in the exemplary examples described herein, comprises a mixture of monofunctional and multifunctional UV-curable acrylates of low molecular weight, and contains from 20% to 80% (wt.) of a low viscosity acrylate, such as the industrial coating product sold by Cognis, of Germany (www.cognis.com) under the product name Photomer 4127™ which is an acrylate monomer having a viscosity of 15 cP at 25° C. The resulting UV-curable material penetrates into the substrate being printed and assures anchoring of the material deposits with the cellulose fibers of paper substrate or the coating particles of a polymer substrate. The anchoring effect increases adhesion of the tactile deposits to the printed substrate. The presence of components with high viscosities is minimized in the preferred formulation, because components with higher viscosities tend to leave tailing marks, which result during the printing process as the material deposited onto the substrate separates from the screen and forms a substrate-to-screen-thread that falls down on the substrate and leaves a tailing mark.

The deposit material 10 used in the examples described herein are transparent or highly translucent so that the tactile markings produced on the exemplary banknotes are non-obtrusive to established designs printed on them. However, this characteristic is not necessary and, for some applications, may not be desired or adopted.

Formulation example "A" for a deposit material composition which has been found to be suitable for the methods described herein, is set out below in Table 1:

TABLE 1

| Formulation "A" | |
| --- | --- |
| Component | Wt. % |
| Cognis-Photomer 4127 ™ | 50.57 |
| Sartomer-CN-9009 ™ | 20.44 |
| Sartomer-SR-9020HP ™ | 8.53 |
| Lamberti-Esacure KS 300 ™ | 3.1 |
| Lamberti-Esacure TZT ™ | 2.17 |

TABLE 1-continued

| Formulation "A" | |
| --- | --- |
| Component | Wt. % |
| Aerosil 200 | 3.12 |
| By post-addition, Sartomer-CD-9053 ™ | 12.07 |

In this example, the composition contains 50.5% of the product Photomer 4127™ of Cognis, having a viscosity of 15 cP at 25° C., as the low viscosity acrylate component. Sartomer—CN9009™ is a UV-curable coating composition product, comprising urethane acrylate oligomer, sold by Sartomer of Pennsylvania, U.S.A. (www.Sartomer.com). Sartomer—SR9020HP™ is a tri-functional reactive diluent of low viscosity (60 cP at 25° C.) and contributes to the penetrating properties of the formulation. Lamberti—Esacure KS 300™ and Esacure TZT™ are photoinitiator products sold by Lamberti S.p.A., of Italy (www.esacure.com). Aerosil-200™, being a hydrophilic fumed silica product available from Evonik Degussa (www.aerosil.com), is provided as an inorganic rheological additive. Sartomer—CD9053™ is an adhesion promoting monomer product sold by Sartomer, comprising a trifunctional acid ester.

The adhesion promoter, being CD9053™ (Sartomer) in the formulation of the composition of the foregoing example, is used to increase the strength of the substrate-penetration-related anchoring effect. The acidic groups of the acidic adhesion promoter, due to their polarity, increase the strength of molecular interactions between the deposit material and the substrate. The acidic groups will also form chemical bonds with the hydroxyl groups of cellulose present in a paper substrate and with hydroxyl, peroxide or hydroperoxide-groups present in the coating on a polymer substrate. A corona-discharge treated polypropylene is also known to contain hydroxyl and hydroperoxide-groups, which will react with the acidic adhesion promoter, providing chemical bonding and strong adhesion between the deposit material and substrate. The purpose of "post addition" of the acid acrylate adhesion promoter is to provide high concentration of this component locally, at the interface of the substrate and the deposit material. Having high concentration of the adhesion promoter at the interface is beneficial to the strength of the adhesive bond.

The formulation of preferred examples of the deposit material composition more generally comprises, for the low viscosity acrylate, an acrylic monomer selected from the group consisting of neopentyl glycol diacrylate (e.g. SR 247 sold by Sartomer or Photomer 4127 sold by Cognis), tetrahydrofurfuryl acrylate (e.g. SR 285 sold by Sartomer), tetrahydrofurfuryl methacrylate (e.g. SR 203 sold by Sartomer), stearyl acrylate (e.g. SR 257 sold by Sartomer) and dipropylene glycol diacrylate (e.g. SR508 sold by Sartomer). The urethane acrylate of the exemplary formulation is an aliphatic polyester urethane acrylate. The reactive diluent component, being SR-9020HP™ in the foregoing exemplary composition, is tri-functional and contributes to lowering the viscosity and the speed of cure. Use of a tri-functional reactive diluent is preferred but a non-tri-functional reactive diluent may be appropriate for use in another application. The rheological additive may, for example, be fumed silica gel as stated in the example (e.g. Aerosil-200™ available from Evonik Degussa) or precipitated silica (e.g. Silica Gel, Grade 9382, 230-400 mesh, available from Sigma-Aldrich, St. Louis, Mo., U.S.A.). A high viscosity which does not contribute to a tailing effect can be achieved by addition of the inorganic rheological additive (Aerosil 200), whereas high molecular weight UV-curable organic components would contribute to the tailing effect.

The substrate-penetration parameter of the deposit material is controlled by means of the concentration of the low viscosity component in the formulation and by screen press parameters, such as heating of the deposited ink before UV curing and the linear velocity of the conveyer belt. An increase in the concentration of the low viscosity component, heating deposited ink before UV curing and slowing down the velocity of the conveyer may be employed to cause the substrate penetration of the deposit material to become more effective. Therefore, changes of concentration of the low viscosity component in the formulation and control of press parameters provide opportunities to adjust the formulation to best fulfill the application requirements, that is, to achieve high adhesion and high durability of the tactile dots.

The banknote-printed tactile marks produced according to the foregoing demonstrate significantly improved durability for the expected period of use of the banknote. Physical resistance tests were performed on the banknote printed, UV-cured tactile marks by subjecting them to crumple, tumbling and abrasion tests. Chemical resistance tests were also performed whereby tactile marks deposited onto paper and polymer substrates were immersed in organic solvents, acids and bases.

In particular, a standard crumpling procedure was performed using an IGT Crumple Tester (from Research North America, Cherry Hill, N.J.). Tactile marks deposited onto paper were crumpled 8 times, while the dots deposited onto a polymer substrate were crumpled 24 times. In both cases, the tactile marks remained on the substrate after the crumpling was finished. That crumpling test is used effectively for banknotes and is considered to be harsher than several years of circulation of a banknote. Other durability tests carried out on the dots were tumbling tests. The tumbling tests were carried out using a rubber-lined lapidary tumbler filled with 24 zirconium oxide balls, each weighing 31.5 grams. A 4"×4" cloth wetted with 5 grams of artificial sweat was also placed inside of the tumbler. The tumbling test was carried out for two hours at room temperature and all of the tested tactile marks survived this test.

Abrasion tests were also carried out using a Taber Abraser, Model 503 (Taber Instrument Company, North Tonawanda, N.Y.), with S-10 abrasive wheels loaded with 250 grams of weight for testing of tactile marks on a paper substrate, and 500 grams for tactile marks deposited on a polymer substrate. Two tests were done for each substrate: one with 100 rotations and one with 400 rotations of the abrasive wheels. The tactile marks survived the abrasive actions and retained an acceptable level of tactility after 400 rotations.

Chemical resistance tests performed on the tactile marks also showed them to be durable. The tactile marks survived a 30 minute exposure (at room temperature) to each of methanol, ethanol, tetrachloroethylene toluene and heptane, without noticeable damage.

The easy-to-feel tactility of the UV-cured dots produced according to the foregoing description, and their strong adhesion, assist visually impaired people in validating security documents such as banknotes and, therefore, serve to provide a certain level of security to those banknotes. Thus, the tactile marks themselves, and the tactile perception they enable, provide a first level of security. Additional steps may be taken as detailed in the following to provide higher levels of security, if desired.

Figure 3:
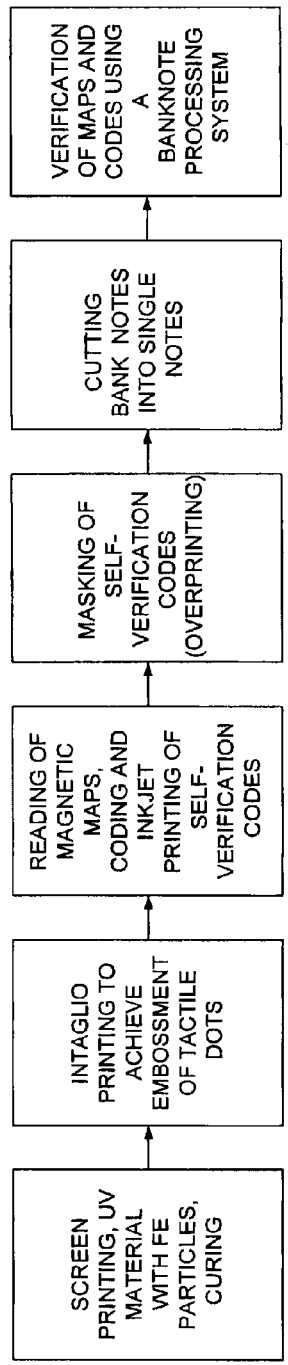
FIG. 3 is a block diagram showing the steps of a further embodiment of the invention which includes features of signature mapping and self-verification.
Figure 4:
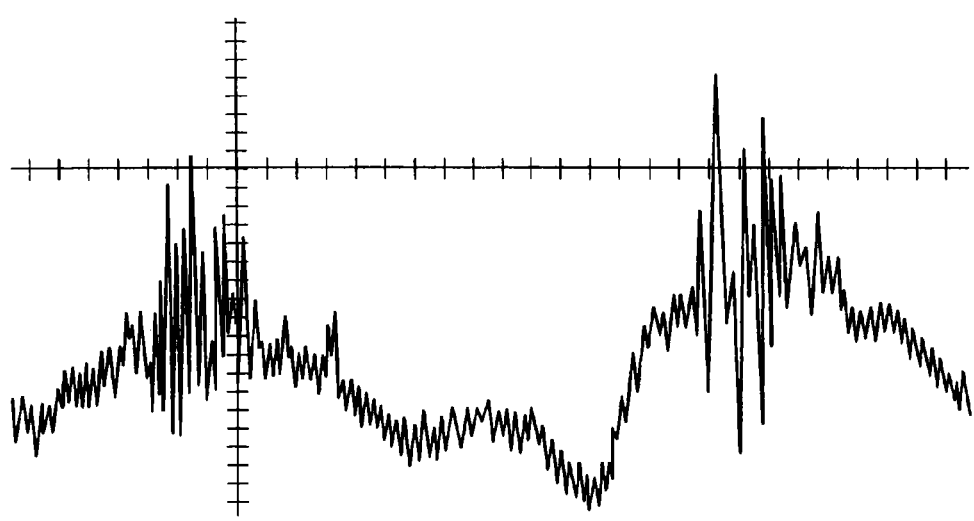
FIG. 4 is a graphical illustration of a magnetic response/signature in accordance with an embodiment of the invention.

Optionally, as illustrated in FIG. 3, a higher level of security may be provided by adding to the deposit material used for the tactile marks an amount of a predetermined (i.e. pre-selected) taggant. For example, one of the well-known fluorescent ink components may be added to the deposit material, and then the printed tactile marks made from that material are tested for the presence of that pre-selected fluorescent additive. Similarly, particles detectable using magnetic fields could be added to the deposit material, for example ferromagnetic particles such as carbonyl iron particles. In one example a security feature was provided in this manner by generating a random signature from large (about 30-40 μm) clusters of fluorescent and magnetic particles in the deposit material. This signature is then applied to the document so that this information can be later used to verify the authenticity of the document. The signature may take the form of a self-verification number or may identify statistical characteristics of the clusters, for example. Alternatively, the signature may correspond to a signal generated from signal-creating clusters of fluorescent and/or magnetic particles in the printed deposit forming the tactile mark. This provides security to the document, because the random characteristics of clusters and particles, such as position and intensity, are practically impossible to duplicate. Therefore, on presentation of the document, it can be verified to be authentic if the presence of such characteristics is confirmed.

For example, the following materials are suitable as taggants:

1. Magnetic materials: Fine particles of carbonyl iron, magnetic iron oxides, particles with permanent magnetization (eg. $CoFe_2O_4$), may be added as taggants. For example, soft iron particles known as carbonyl iron, with average sizes of 4.5 μm (available from the BASF Corporation, Florham Park, N.J.), may preferably be used as a soft-magnetic taggant or a mapping material. More generally, particles with magnetic properties having a size from 1-80 μm may be suitable for use. Concentrations of carbonyl iron as low as about 0.65% wt., expressed as a weight percent of the deposit material, are easily detectable with permanent-magnet-backed standard electrodynamics reading heads. Even if the iron particles are well dispersed, a unique magnetic signature with fine lines can be obtained. Higher concentrations of carbonyl iron particles, approaching about 2.5% wt., were found to demonstrate the presence of self-agglomerated clusters of iron particles.

2. Fluorescent pigments or dyes: Fluorescent dyes or very fine particles, about 1 μm or smaller, could provide the effect of fluorescence. Examples of such pigments are Scanning Compounds #4 and #6 (available from Angstrom Technologies, Florence, Ky.). Conversion of the fluorescent particles into clusters, for example by attaching them to much larger particles of silica-gel (silica-gel with sizes from 5 to 50 μm) makes the mapping-signature approach, based on fluorescence, much easier to implement. Fluorescent particles with larger sizes (from 5 to 50 μm), are also available and are suitable for making of mapping-based fluorescent signatures. The conversion of small fluorescent particles or dyes into clusters can be accomplished by mixing all the components in a solvent and filtering off the fine particles. The fluorescent clusters will remain on the filtration paper. After drying the clusters, they are suitable for addition to the UV-curing deposit material for making of tactile marks. Making combination clusters, containing both magnetically-detectable and fluorescent particles within the same cluster is also possible. Other alternatives for signature-mapping include combinations of mixed clusters with "pure clusters" and should be easily conceptualized by a person skilled in the art of security-related taggants.

3. Elemental silicon: Elemental silicon in various particle sizes (including nanoparticles) can be used for signature-mapping purposes in the same way as the above-mentioned fluorescent pigments. Nano-particles of elemental silicon can provide sharp fluorescent peaks at essentially any desired visible wavelengths. Both, nano-particles and larger-size particles of elemental silicon can be converted into clusters for signature-mapping. Elemental silicon particles of various sizes and with various dopants (available from Nanostructured & Amorphous Materials, Inc., Houston, Tex.) provide fluorescence, which is dopant-and-size-dependent. The doped or undoped elemental silicon particles are suitable for signature-mapping purposes.

4. Fluorescent nano-particles: Fluorescent nano-particles, such as EviDots™ (available from Evident Technologies, Troy, N.Y.) can be used to create "very high resolution fluorescent signature-mappings", potentially suitable for a forensic-level authentication.

5. Taggants containing two areas with fluorescence of different color: Taggant particles having two different areas with different fluorescence could provide authentication verifiable using UV-light and a magnifying glass. For example, if the two areas provide, correspondingly, red and yellow fluorescence, the color will appear as orange to the naked eye. However, under a magnifying glass, the taggants will be visible as consisting of red and yellow segments, located in close proximities. Taggants of this type are available from ARmark Authentication Technologies (Glen Rock, Pa.) and, as fibers, from Shanghai KOS Papermaking Anti-Counterfeit Technology (Shanghai, China).

6. Retroreflective glass beads: As taggants, retroreflective glass beads could be identified using a source of light or a simple handheld authenticator, such as Model 101X authenticator (available from TSSI Systems, Ltd. Swindon, United Kingdom). Retroreflective beads are also available in a fluorescent version (GL-0327 from MO-SCI Specialty Products, L.L.C., Rolla, Mo.). The retroreflective beads, both fluorescent and non-fluorescent, could be used for a signature-mapping approach.

7. Cholesteric liquid crystal: Standard cholesteric liquid crystal pigments or cholesteric liquid crystal particles with magnetic properties may also be used as taggants, where the cholesteric liquid crystal materials, in addition to magnetic properties, demonstrate optical interference effects resulting in angle-dependent apparent colors. Examples of such pigments are described in U.S. Pat. No. 6,875,522 B2 (Seto/SICPA, 2005) and U.S. Pat. No. 7,169,472 B2 (Raksha/JDS Uniphase, 2007). Cholesteric liquid crystals can also be used as semi-covert taggants, as described in Example 4.

8. Particles with piezoelectric properties: Crystalline barium titanate particles may be used as taggants in the tactile marks (dots). For example, barium titanate particles with various degrees of crystallization are available from MO-SCI Specialty Products, L.L.C., Rolla, Mo., U.S.A. Application of an alternating external electric field to tactile dots with barium titanate particles will cause transduction from the AC electrical field into mechanical vibrations of the particles with proper microcrystal/grain orientations relative to the direction of the AC field. The vibrations, which may be of sonic or ultrasonic frequency, may be used as an additional overt or covert characteristic for use in the identification of banknotes (or, more generally, security documents). The piezoelectric effect may be enhanced through orientation of the $BaTiO_3$ micrograins using a process known as electrical poling. The poling process requires application of an electrical field of about 1 kV/mm (at 90° C.). This process can be applied during screen printing process, immediately before exposure of deposited dots to the UV light.

A person skilled in the art of taggant applications can easily find other combinations of the listed above taggants and recording methods.

Tactile marks comprising machine-readable or detectable taggants (magnetic or fluorescent particles or clusters and retro-reflective beads), as described above, may be used to generate a unique, and therefore secure, fine-detail-signature or map. In one example, the signature/map consists of a table of values corresponding to machine-readable positions and intensities of peaks of characteristics of the taggants, being the positions and intensities of the peaks of magnetic signals. This table of values can then be converted into a code, preferably with encryption, and recorded as a hidden magnetic barcode on the banknote. Hiding of the barcode is achieved by overprinting of the magnetic barcode with an obscuring ink, an example of which is an ink containing titanium dioxide pigment, and matching the color of the over-coating with the color of the background.

A low-cost but high security solution is provided by a detector which reads both the signature/map of the taggant and the barcode. An example of such a solution uses a soft-magnetic taggant (such as carbonyl-iron particles) and an ink-jet printed barcode containing also soft-magnetic particles to generate the barcode signals. Another example, uses fluorescent taggants, whereby an optical detector detects the characteristics to determine the signature from the fluorescent taggant and reads the printed signature in the form of a fluorescent barcode. An invisible fluorescent barcode can be printed using invisible fluorescent inks and, therefore, does not require masking to hide it within the banknote design.

This means that using a signature/map to define characteristics of taggants in tactile marks provides a high level of security because reproduction of such signatures/maps is very difficult to achieve, without prohibitive cost, by known technologies.

In addition to the foregoing optional security features that may be incorporated into the deposit material of the tactile marks, the step of printing the tactile marks provides further opportunity to add security features. For example, the silk-screen process provides an opportunity to print optical elements, known as microlenses. The microlenses consist of glass beads deposited through shapes designed on the printing screen. The glass beads, with diameters from 20 μm to 100 μm, are tightly spaced (side-by-side), preferably in a single layer. These glass beads, when deposited on line-work consisting of thin lines, with a pitch close to the diameter of the glass beads, create Moiré patterns. These Moiré patterns appear to the outside observer as moving shapes, when the observer changes his or her angle of observation. The area where the microlenses are printed will have a different tactility or touch than the remaining part of the banknote. The moving Moiré patterns provide additional street-level security to banknotes.

The following describes two application examples by which these security features were implemented, the first, example "A", providing a high level security and the second, example "B" providing a relatively low cost solution.

Example "A"

1. Transparent tactile marks are deposited onto substrate sheets of banknote substrate using screen printing (flat or high-speed rotary screen), whereby the composition of the deposit material forming the marks includes a taggant, as described above, for example sparsely dispersed, i.e. very low concentration (0.1% or less), carbonyl-iron particles of 4.5 micron (average) size. The soft-magnetic taggant (carbonyl-iron) provides a source of magnetic characteristics used to define a signature/map. The composition of the deposits/marks also includes an invisible fluorescent taggant, for example 0.1% of high intensity invisible fluorescent pigment (Lumilux™ CD-777 from Honeywell, Morristown, N.J.). The intense fluorescence of the transparent marks is used for simple point-of-sale verification. Since the magnetic particles will be at a very low concentration, other taggants may be added, if desired, to further increase the level of security. For example, retroreflective beads, retroreflective beads with fluorescence, other fluorescent clusters or particles, recordable or permanent-magnetism magnetic particles, magnetic clusters or magnetic optically variable (interference) pigments.

2. Microlenses, mixed into the deposit material, are printed as the tactile marks are printed. With appropriately selected pitch of the background image, close to the diameter of the glass beads, the microlenses/beads will create kinetic Moiré effects. The resulting kinetic Moiré effects as well as the different tactility of the microlenses area (compared to the remaining part of the banknote) create additional street-level security for the banknote. The microlenses are selected to provide an optical magnification of at least 2.

3. The deposits are cured using ultraviolet light.

4. Intaglio printing is applied to the substrate sheets, if desired, to print patterns onto the banknote.

5. The taggant (or multiple taggants) is scanned by means of a scanner appropriate for the characteristic (i.e. physical effect) of the taggant, and the measured characteristics are used to define a signature/map, which, preferably, is encrypted to produce a self-verification number. If more than one taggant is used, multiple verification numbers may be produced and recorded as self-verification numbers.

6. The self-verification number is recorded on the banknote. The preferred method for recording the self-verification number is by a magnetic barcode using ink-jet printing. The recorded barcode is preferably masked by over-coating using an ink containing titanium dioxide and matching the background color. Additional or alternative self-verification codes may be recorded by appending them to the main magnetic barcode verification number, or by recording them on the banknote by other means, such as invisible (fluorescent) two-dimensional barcodes or holographic microperforations.

7. The printed substrate sheets are cut into single banknotes and the self-verification feature is tested using a quality control machine.

8. Once in circulation, the banknotes can be verified in point-of-sale locations using a simple automatic currency detector which, magnetically or optically, determines and compares a signature/mapping of the taggant's characteristics of the tactile marks with the recorded self-verification number. Commercial banks and the central bank can also test secondary signatures/maps by comparing them with recorded secondary verification numbers. Optionally, the process may include addition of a code corresponding to the serial number of a banknote to facilitate tracing of the flow of the banknote even at the point-of-sale level and enable a bank to automatically track its inventory of banknotes within a branch. This may also be used to capture persons involved in bank robberies and/or to trace illegal transactions.

Example "B"

For a low-cost implementation, an example is a production process that is essentially the same as in the higher security example of the foregoing Example "A", except that the taggants are selected to be detectable with low cost detectors and the signature/mapping is omitted. The preferred taggants for the low-cost implementation are based on larger-size (about 10 μm) soft-magnetic particles or soft-iron clusters. Fluorescent pigments of high intensity can be used to provide detection by low-cost UV-based currency detectors; i.e. the currency detectors verify the presence of a soft-magnetic material and measure the approximate position, magnitude and variability of the magnetic signals. Spectral characteristics of the fluorescent taggants can be verified using optical filters.

In another example using the ink formulation "A" described herein, 100 parts (wt.), was mixed with 6.01 parts (wt.) of LC-528 cholesteric liquid crystal pigment (purchased from Wacker GmbH, Stuttgart, Germany), resulting in 5.67% (wt.) concentration of LC-528 in the UV-curable resin. The resulting mixture was almost transparent. The UV-curable material was then screen printed, as tactile dots, on a paper substrate with slightly tinted but still very light-coloured printed background. The printed dots were then cured using UV-light. The presence of the pigment in the cured dots was almost unnoticeable. The optical effect appeared when a left-circular polarization filter was placed over the dots. The dots became well visible and a strong color shift was observed with different angles of observation. This effect of strong visualization of the nearly-invisible pigments and strong enhancement of their color shift, using an appropriate circular polarization filter can be utilized as a simple point of sales test of authenticity of banknotes.

Various exemplary embodiments have been disclosed by the foregoing and are to be considered as illustrative only, not restrictive or limiting of the scope of the invention. It is to be understood by the reader that various changes and modifications can be made while still making use of the invention, which is defined by the appended claims, and without departing from the scope thereof. All variations and equivalents coming within the meaning of the appended claims are intended to be embraced within the scope of the present invention.

What is claimed is:

1. A method for making a plurality of tactile marks on a security document substrate, comprising the steps:
    (a) printing deposits onto the security document substrate in a predetermined pattern using an ultraviolet light curable deposit material comprising:
        (i) 20-80% by weight of low viscosity acrylate having a viscosity below 200 cP at 25° C.;
        (ii) 1-30% by weight of urethane acrylate;
        (iii) 1-30% by weight of reactive diluent;
        (iv) photoinitiator in an amount sufficient to enable curing of the deposit material;
        (v) 1-10% by weight of rheological adsorbing additive comprising silica; and,
        (vi) 2-30% by weight of trifunctional acid ester,
    wherein the specified weight percentages of components (i)-(iii), (v) and (vi) are relative to a total weight of components (i)-(vi) combined, and the deposit material has a viscosity in the range of about 2,000 cP to 25,000 cP at 25° C.; and,
    (b) exposing the printed deposits to ultraviolet light to cure the printed deposits and form a plurality of tactile marks on the security document substrate wherein the tactile marks have easy-to-feel tactility for assisting the visually impaired to distinguish the printed, exposed security document substrate.

2. The method of claim 1 whereby the trifunctional acid ester is added after components (i) to (iv) have been at least partly adsorbed on the rheological adsorbing additive.

3. The method of claim 2 whereby the photoinitiator is a mixture of photoinitiators.

4. The method of claim 2 whereby the reactive diluent is tri-functional.

5. The method of claim 2 whereby the photoinitiator is in an amount of 1-12% by weight relative to a total weight of components (i)-(vi) combined.

6. The method of claim 2 whereby the low viscosity acrylate is an acrylic monomer selected from the group consisting of neopentyl glycol diacrylate, tetrahydrofurfuryl acrylate, tetrahydrofurfuryl methacrylate, stearyl acrylate and dipropylene glycol diacrylate; and the urethane acrylate is an aliphatic polyester urethane acrylate.

7. The method of claim 2 whereby the deposits are printed by screen printing.

8. The method of claim 2 whereby the substrate is banknote paper or polymer.

9. The method of claim 1 further comprising controlled heating of the deposits prior to the curing to cause an increase of penetration of the deposits into the substrate.

10. The method of claim 2 whereby the rheological adsorbing additive comprises fumed silica or precipitated silica gel.

11. The method of claim 7 whereby the deposits are printed onto the substrate sheet at a rate of about 1,000-7,300 sheets per hour and cured by providing a total ultraviolet light exposure of about 0.2-3 J/cm$^2$.

12. The method of claim 1 whereby the deposit material further comprises a predetermined taggant the amount and/or pattern of which in the cured deposits is detectable and compared with a self-verification code, and/or a pigment for use as a security feature.

13. The method of claim 2 whereby the deposit material further comprises a predetermined taggant the amount and/or pattern of which in the cured deposits is detectable and compared with a self-verification code, and/or a pigment for use as a security feature.

14. The method of claim 12 whereby the taggant is machine detectable for automated authentication of a banknote comprising the substrate with the tactile marks printed thereon.

15. The method of claim 12 whereby the taggant comprises particles with magnetic properties, having a size from 1-80 micrometers.

16. The method of claim 15 whereby the particles with magnetic properties are selected from the group consisting of carbonyl iron and magnetic iron oxides and their signature is recorded on the substrate as a self-verification code.

17. The method of claim 12 whereby the taggant comprises at least one fluorescent dye.

18. The method of claim 12 whereby the taggant is selected from the group consisting of elemental silicon, retroreflective glass beads, cholesteric liquid crystal pigments, piezoelectric particles and optical-interference-based pigments with magnetic properties.

19. The method of claim 1 whereby the deposit material includes microlenses mixed therein for printing onto the substrate for use as a security feature.

20. The method of claim 19 wherein the microlenses provide an optical magnification of at least 2 and have a predetermined pitch which is close enough to a pitch of a background image of the substrate sheet to create kinetic Moiré effects.

21. The method of claim 1 whereby the printed deposits form dots having circular diameters of 1 mm and heights of in the range of 115 to 170 µm.

* * * * *